(12) United States Patent
Weiher et al.

(10) Patent No.: US 8,693,140 B1
(45) Date of Patent: Apr. 8, 2014

(54) BAYONET-STYLE DISK CLAMP

(71) Applicant: Western Digital Technologies, Inc., Irvine, CA (US)

(72) Inventors: Joshua P. Weiher, San Jose, CA (US); Paul Hughey Henry, San Jose, CA (US); Mark S. Seymour, Felton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/657,558

(22) Filed: Oct. 22, 2012

(51) Int. Cl.
*G11B 17/02* (2006.01)

(52) U.S. Cl.
USPC .................................................. 360/99.12

(58) Field of Classification Search
USPC .................................. 360/99.12, 99.16, 99.08
See application file for complete search history.

(56) References Cited

U.S. PATENT DOCUMENTS

| | | | |
|---|---|---|---|
| 4,918,545 A | 4/1990 | Scheffel | |
| 5,452,157 A | 9/1995 | Chow et al. | |
| 5,517,376 A | 5/1996 | Green | |
| 5,731,928 A | 3/1998 | Jabbari et al. | |
| 5,801,901 A | 9/1998 | Bryan et al. | |
| 5,940,244 A | 8/1999 | Canlas et al. | |
| 6,055,123 A | 4/2000 | Kazmierczak et al. | |
| 6,208,486 B1 | 3/2001 | Gustafson et al. | |
| 6,282,054 B1 | 8/2001 | Luo | |
| 6,304,417 B1 | 10/2001 | Bracken et al. | |
| 6,417,988 B1 | 7/2002 | Renken et al. | |
| 6,567,238 B1* | 5/2003 | Renken et al. | 360/99.12 |
| 6,624,968 B1 | 9/2003 | Chessman et al. | |
| 6,724,568 B1 | 4/2004 | Suwito et al. | |
| 6,760,188 B2 | 7/2004 | Choo et al. | |
| 6,788,495 B2 | 9/2004 | Aiello | |
| 7,009,809 B2* | 3/2006 | Hanssen | 360/99.12 |
| 7,042,676 B2 | 5/2006 | Yoo | |
| 7,379,267 B2* | 5/2008 | Engesser et al. | 360/99.12 |
| 7,589,935 B2 | 9/2009 | Kim | |
| 7,823,270 B2 | 11/2010 | Choo et al. | |
| 7,872,830 B2 | 1/2011 | Ruden et al. | |
| 2002/0071206 A1 | 6/2002 | Choo et al. | |
| 2002/0109939 A1* | 8/2002 | Schwandt et al. | 360/99.12 |
| 2005/0174684 A1* | 8/2005 | Hanssen | 360/99.12 |
| 2006/0139800 A1 | 6/2006 | Takahashi | |
| 2007/0035876 A1* | 2/2007 | Engesser et al. | 360/99.12 |
| 2007/0058292 A1* | 3/2007 | Choi et al. | 360/99.12 |
| 2007/0159717 A1* | 7/2007 | Miyajima et al. | 360/99.12 |
| 2008/0019039 A1* | 1/2008 | Ng et al. | 360/99.12 |
| 2011/0093874 A1 | 4/2011 | Suzuki | |
| 2012/0050913 A1* | 3/2012 | Jang et al. | 360/99.12 |

* cited by examiner

*Primary Examiner* — Allen T Cao (57) ABSTRACT

A disk drive assembly having a disk hub having a cylindrical portion; and a disk clamp retaining portion formed on a vertical portion of the cylindrical portion of the disk hub; a disk clamp having: a body portion; and a retained portion which engages the disk clamp retaining portion of the disk hub to secure the disk clamp to the disk hub; and a disk media disposed between the disk clamp and the disk hub, the disk media being secured in place by the disk clamp.

27 Claims, 8 Drawing Sheets

BAYONET-STYLE DISK CLAMP

FIELD

The present disclosure relates generally to information storage devices, and in particular to a disk drive having a disk clamp having a non-circular opening and a hub having a non-circular protrusion that is inserted into the non-circular opening.

BACKGROUND

Disk drives typically include a disk clamp that provides a disk clamping force for holding one or more disks to a hub. Thus, disk clamping is becoming more and more important not only for regular hard disk drive (HDD) performance but also under extreme conditions such as operational shock and non-operational shock. A reliable clamping force may maintain the integration of the whole disk pack, preventing the disk from separating or sliding under shock event. A reliable clamping force also helps limit the disk deflection, avoiding the disk contact with other components including arms, cover, base and suspensions under low G shock.

With increasingly thinner HDD design, disk clamping design may become challenging due to limitations of smaller form factors.

Further, in some designs scraping or scratching can occur between the disk clamp, disk hub, and disk media during assembly and such scraping or scratching can cause particles of material to be generated that can interfere with the operation of the HDD.

There is therefore a need for an improved disk clamp design and assembly process.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
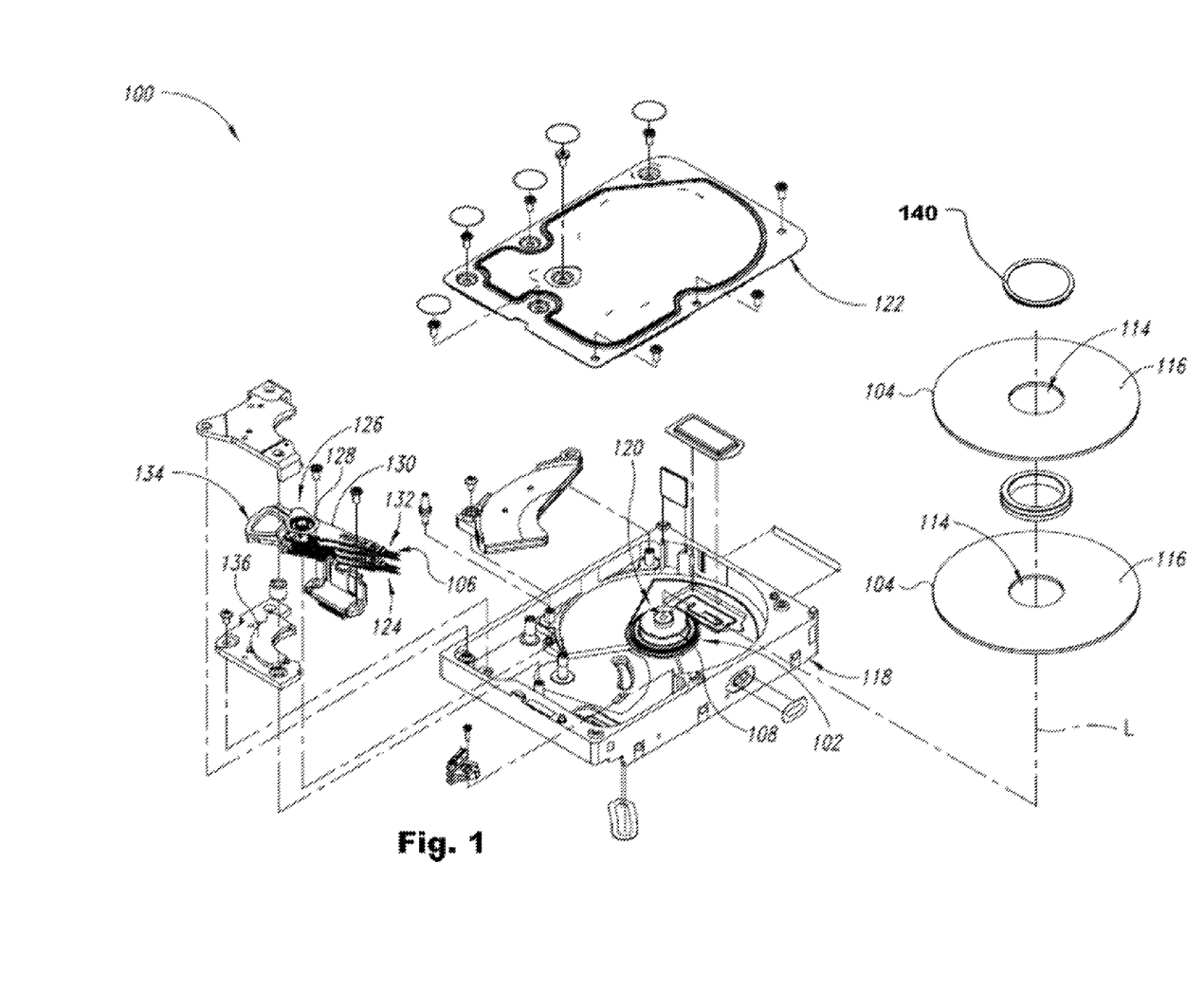
FIG. 1 is an exploded, perspective view generally illustrating a disk drive including an example clamp and hub according to an embodiment

Referring to FIG. 1, a disk drive 100 is illustrated, according to one embodiment. The disk drive 100 comprises a hub 102, a disk 104 physically contacting and supported by at least one mounting surface (not labeled in FIG. 1, shown in FIG. 4 below) of the hub 102, and a head 106 operable to write to and read from the disk 104. In one embodiment, the hub 102 comprises a substantially cylindrical portion 108 which define a longitudinal axis L and a mounting surface (not labeled in FIG. 1, shown in FIG. 4 below) substantially normal to the longitudinal axis L, the mounting surface (not labeled in FIG. 1, shown in FIG. 4 below) extending radially outward.

As illustrated herein, the disk drive 100 comprises a magnetic disk drive, and the structures and methods described herein will be described in terms of such a disk drive. However, these structures and methods may also be applied to and/or implemented in other disk drives, including, e.g., optical and magneto-optical disk drives.

The disks 104 may comprise any of a variety of magnetic or optical disk media having a substantially concentric opening 114 defined there through. Of course, in other embodiments, the disk drive 100 may include more or fewer disks. For example, the disk drive 100 may include one disk or it may include two or more disks. The disks 104 each include a disk surface 116, as well as an opposing disk surface not visible in FIG. 1. In one embodiment, the disk surfaces 116 comprise a plurality of generally concentric tracks for storing data.

As illustrated, the hub 102 may be coupled to and support the disks 104. The hub 102 may also be rotatably attached to a motor base 118 of the disk drive 100, and may form one component of a motor 120 (e.g., a spindle motor). The motor 120 and the hub 102 may be configured to rotate the disks 104 about the longitudinal axis L.

Further, a disk clamp 140 may be coupled to the hub 102 to provide a downward clamping force to the disks 104. Specifically, the disk clamp 140 may be positioned above the disks 104 and attached to an upper surface of the hub 102. The interaction of the disk clamp 140 and the hub 102 to provide the downward clamping force is discussed in more detail below.

The disk drive 100 may further include a cover 122, which, together with the motor base 118, may house the disks 104 and the motor 120. The disk drive 100 may also include a head stack assembly ("HSA") 124 rotatably attached to the motor base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding disk 104. The HSA 124 may further include a coil 134 through which a changing electrical current is passed during operation. The coil 134 interacts with one or more magnets 136 that are attached to the motor base 118 to form a voice coil motor ("VCM") for controllably rotating the HSA 124.

The head 106 may comprise any of a variety of heads for writing to and reading from a disk 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magneto resistive. In optical and magneto-optical recording applications, the head may include a mirror and an objective lens for focusing laser light on to an adjacent disk surface.

The disk drive 100 may further include a printed circuit board ("PCB") (not shown). The PCB may include, inter alia, a disk drive controller for controlling read and write operations and a servo control system for generating servo control signals to position the actuator arms 130 relative to the disks 104.

Figure 2:
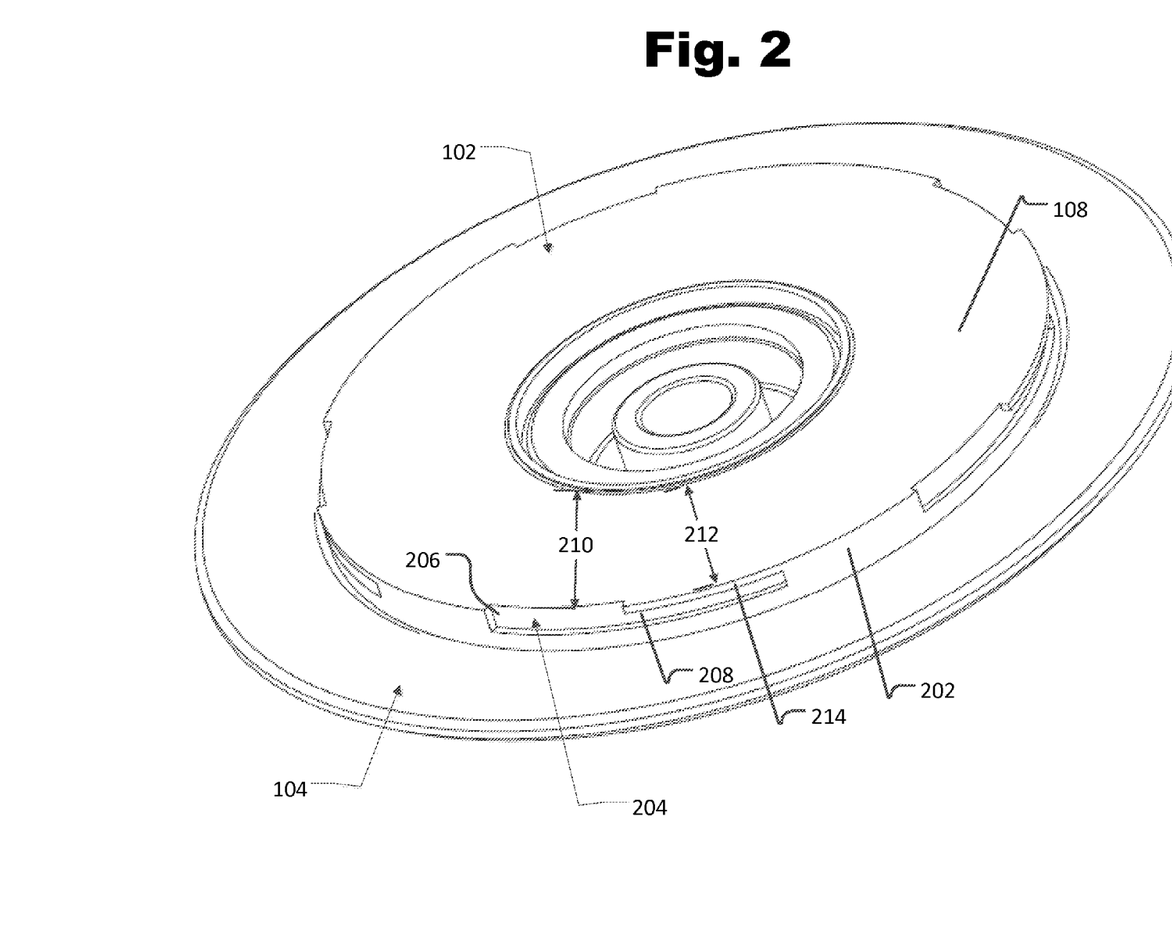
FIG. 2 is a perspective view illustrating a first example embodiment of the disk hub of FIG. 1.

FIG. 2 is a perspective view illustrating a first example embodiment of the disk hub 102 of FIG. 1. As illustrated, the hub 102 comprises a cylindrical portion 108 and a mounting surface (not labeled in FIG. 2, shown in FIG. 4 below) on which a disk 104 has been mounted in FIG. 2. The cylindrical portion 108 has a sidewall that forms a vertical surface 202.

A notch 204 is formed in the vertical surface 202 of the sidewall of the cylindrical portion 108. In some embodiments, the notch 204 may be formed with a semi-circumferential shape formed in the vertical surface 202 of the sidewall. This notch 204 engages a retained feature 304 of a disk clamp 140 (shown in FIG. 3 below). The notch 204 may include an entry portion 206 and a retaining portion 208. The entry portion 206 of the notch 204 forms a region of the cylindrical portion 108 which has a reduced radius 210 at the upper most portion of the vertical surface 202. Further, the retaining portion 208 of the notch 204 forms (1) a region of the cylindrical portion 108 which has a radius 212 substantially equal to the average radius of the cylindrical portion 108 at the uppermost portion of the vertical surface 202, and (2) a region having a reduced radius at a portion of the vertical surface 202 below the uppermost portion. Thus, a retaining lip 214 is formed above the retaining portion 208.

In some embodiments, more than one notch 204 may be formed in vertical portion 202 of the cylindrical portion 108 of the hub 102. The number of notches is not particularly limited, to any number. Additionally, two or more notches may be connected by a groove (not shown) provided, such that the two or more notches communicate there between.

Figure 3:
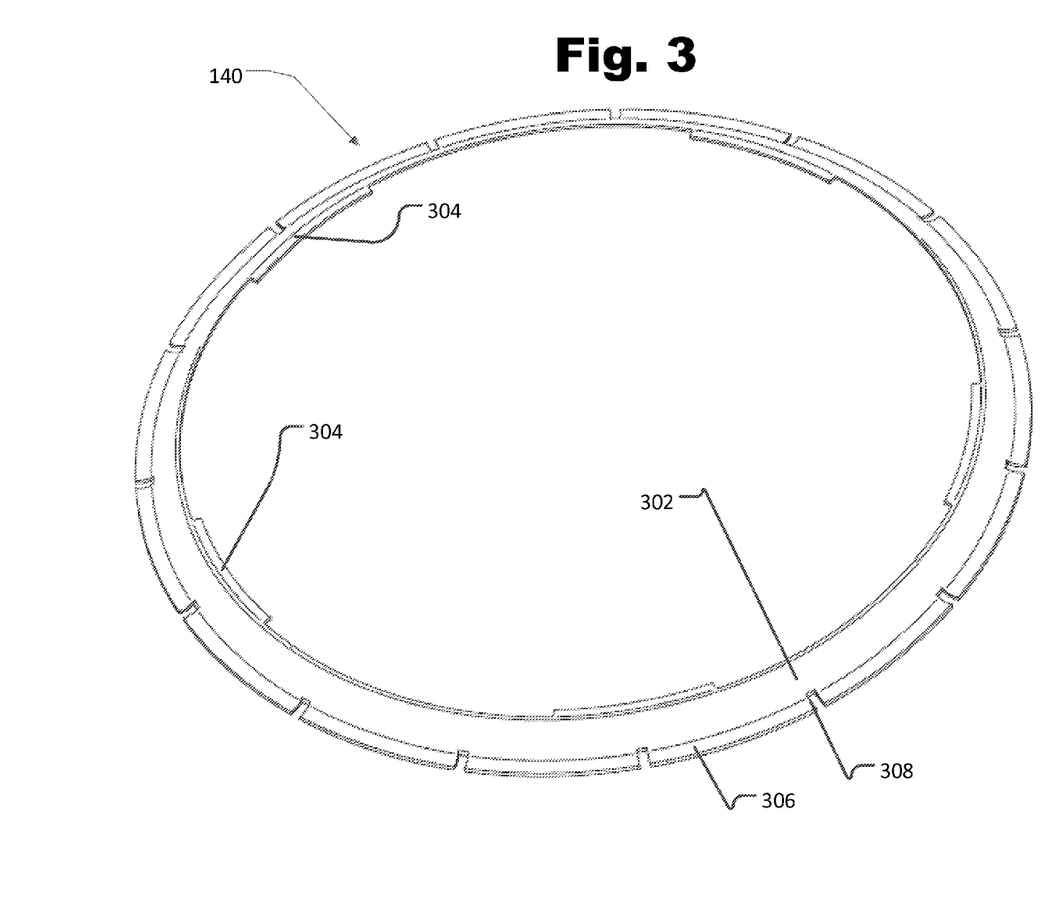
FIG. 3 is a perspective view illustrating a first example embodiment of the disk clamp of FIG. 1.

FIG. 3 is a perspective view illustrating a first example embodiment of the disk clamp 140 of FIG. 1. As illustrated, the clamp 140 includes a body 302 from which one or more retaining tabs 304 extend. Additionally, the clamp 140 includes one or more disk pressure applying portions 306, which extend from the body 302, and which contacts the disk 104 to apply a clamping force.

In some embodiments, the body 302 may have an annular shape, which is inclined in a radial direction. Additionally, on some embodiments, the one or more retaining tabs 304 extend radially inward from the body portion 302. Further, in some embodiments the one or more disk pressure applying portions extend radially outward from the body portion 302.

Further, the body 302 is formed so as to be deformable such that disk pressure applying portion 306 may be deflected upward (with respect to the retaining tabs 304) prior to installation of the disk clamp 140 on the disk hub 102. More specifically, the disk pressure applying portion 306 may be deflected, and while being maintained in a deflected state, the retaining tabs 304 of the disk clamp 140 are aligned with the entry portions 206 of the notches 204 of the disk hub 102. Once the retaining tabs 304 of the disk clamp 140 are aligned with the entry portions 206 of the notches 204 of the disk hub 102, the disk clamp 140 and disk hub 102 are moved toward each other. Then, the disk clamp 140 and the disk hub 102 are rotated with respect to each other until at least one of the disk retaining tabs 304 of the disk clamp 140 engages a retaining portion 208 of a notch 204 of the disk hub 102. The deflection and installation are discussed in more detail below.

Further, in some embodiments, one or more notches 308 may be provided in the one or more disk pressure applying portions 306 to provide a gripping location for deflection of the disk pressure applying portions 306.

Figure 4:
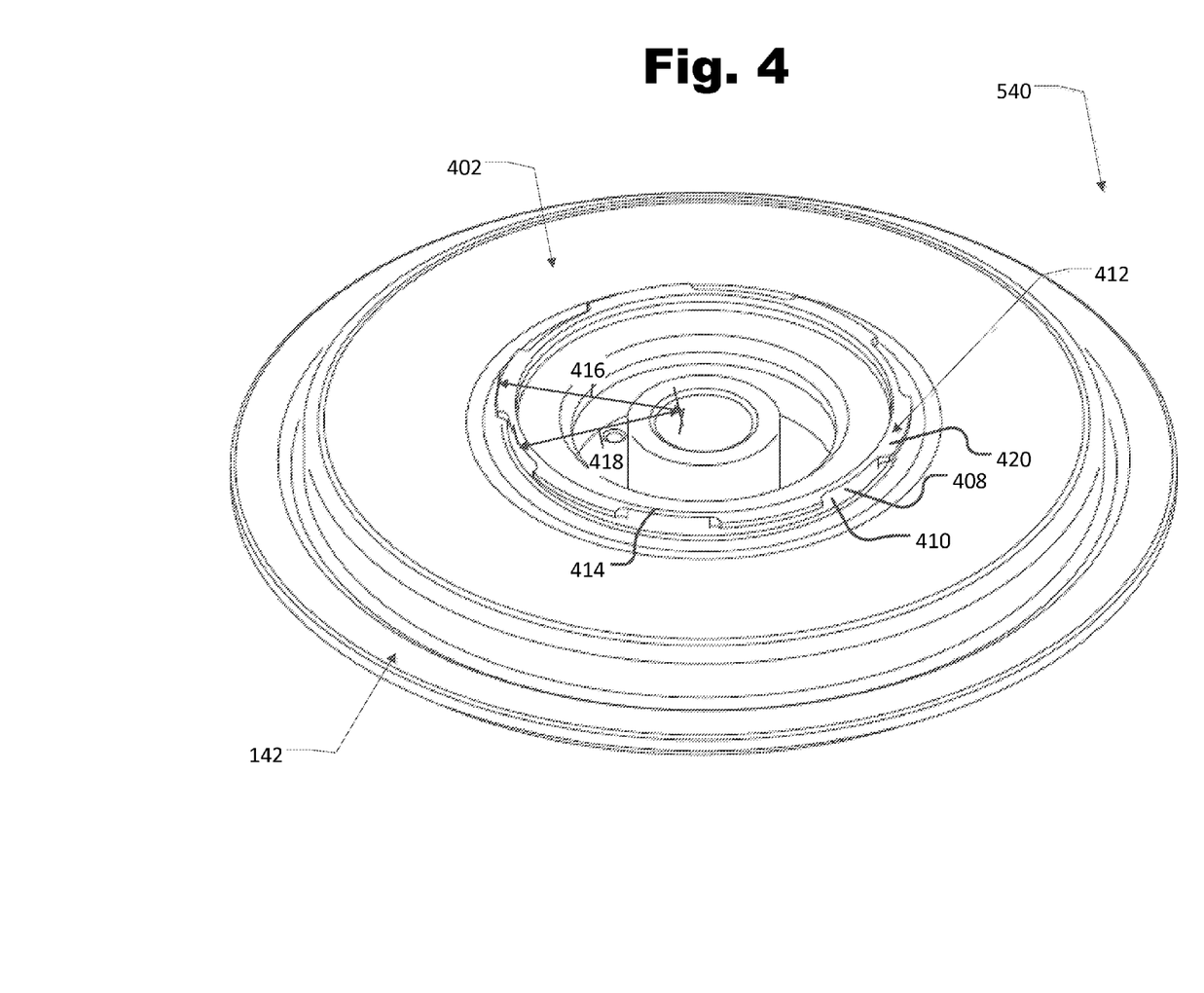
FIG. 4 is a perspective view illustrating a second example embodiment of a disk hub 402 similar to the disk hub 102 of FIGS. 1 and 2.

FIG. 4 is a perspective view illustrating a second example embodiment of a disk hub 402 similar to the disk hub 102 of FIGS. 1 and 2. This second example embodiment of the disk hub 402 has some features similar to the first example embodiment such that redundant description is omitted.

As illustrated, the hub 402 comprises a cylindrical portion 408 (similar to the cylindrical portion 108 shown in FIGS. 1 and 2) and a mounting surface 142 on which a disk 104 has been mounted in FIG. 2. The cylindrical portion 408 has a sidewall that forms a vertical surface 410.

At least one retaining tab 412 is formed in the vertical surface 202 of the sidewall of the cylindrical portion 408. This retaining tab 412 engages a retained feature 504 of a disk clamp 540 (shown in FIG. 5 below).

In some embodiments, more than one retaining tab 412 extends from the vertical surface 410 of the disk hub 402. The number of retaining tabs 412 is not particularly limited to any number.

Further, in some embodiments, the tabs 412 may be regularly spaced around the circumference of the cylindrical portion 408 of the disk hub 402. Further, one or more entry notches 414 may be formed between adjacent retaining tabs 412. The entry notches 414 form regions of the cylindrical portion 408 that have a radius 418 substantially equal to the average radius of the cylindrical portion 408 at the uppermost portion of the vertical surface 410. Further, the retaining tabs 412 form regions of the cylindrical portion 408 which have a radius 416 greater than the radius 418 of the regions of the cylindrical portion formed by the entry notches 414. Thus, a retaining lip 420 is formed below the retaining tab 412.

Figure 5:
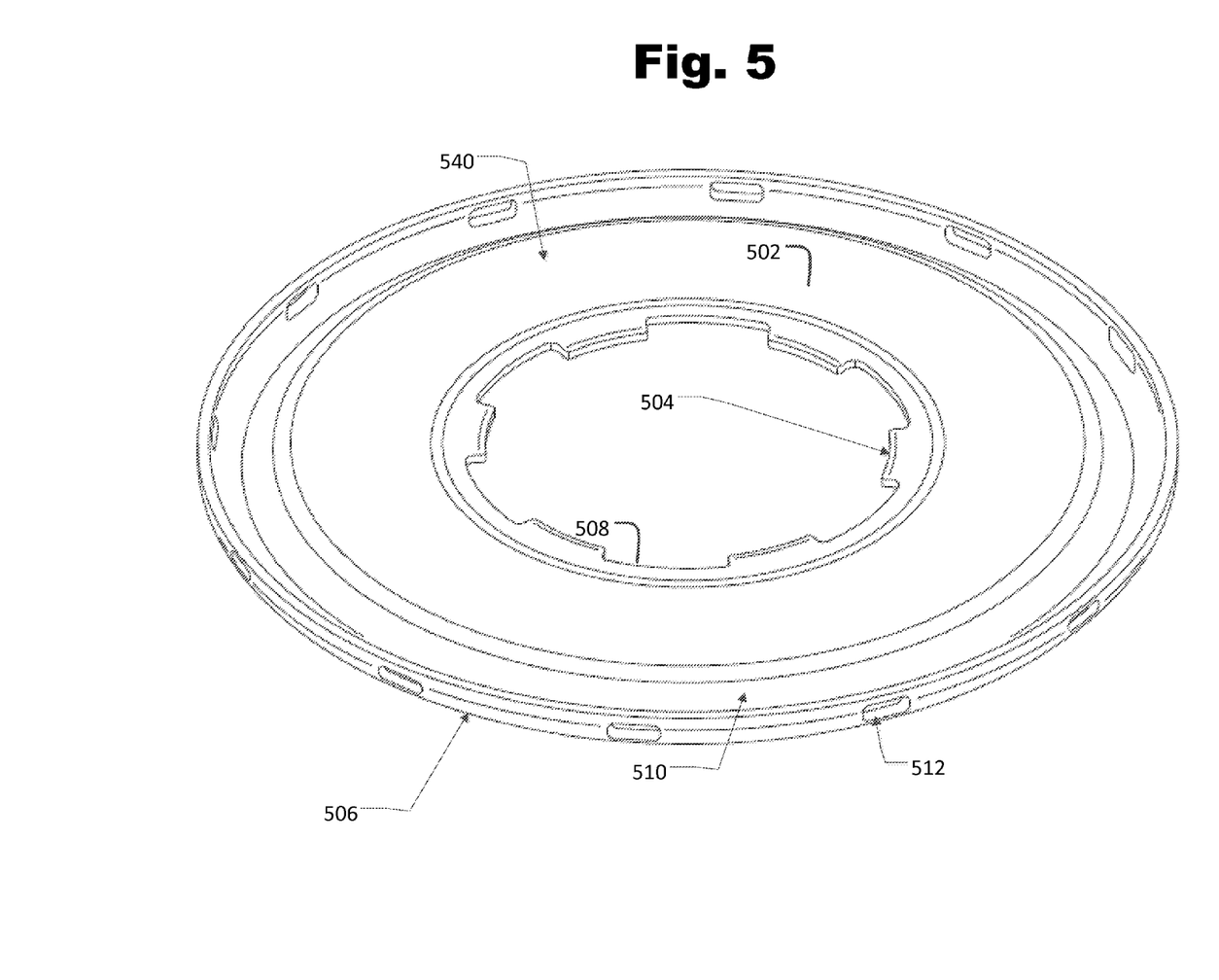
FIG. 5 is a perspective view illustrating a second example embodiment of a disk clamp similar to the disk clamp 140 of FIGS. 1 and 3.

FIG. 5 is a perspective view illustrating a second example embodiment of a disk clamp 540 similar to the disk clamp 140 of FIGS. 1 and 3. This second example embodiment of the disk hub 402 has some features similar to the first example embodiment such that redundant description may be omitted.

As illustrated, the clamp 540 includes a body 502 from which one or more retaining tabs 504 extend. Additionally, the clamp 540 includes a disk pressure applying portion 506, which extends from the body 502, and which contacts the disk 104 to apply a clamping force.

In some embodiments, the body 502 may have a flat disk shape, which extends in a radial direction. Additionally, on some embodiments, the one or more retaining tabs 504 extend radially inward from the body portion 502. Further, in some embodiments the disk pressure applying portion extends radially outward from the body portion 502. Further, in some embodiments the body 502 may have an inclined region 510 disposed radially inward of the disk pressure applying portion 506.

Further, the body 502 is formed so as to be deformable such that disk pressure applying portion 506 may be deflected upward (with respect to the retaining tabs 504) prior to installation of the disk clamp 140 on the disk hub 102. Specifically, the inclined region 510 may be deformable. More specifically, the disk pressure applying portion 506 may be deflected, and while being maintained in a deflected state, the retaining tabs 504 of the disk clamp 540 are aligned with the entry notches 414 of the disk hub 402. Once the retaining tabs 504 of the disk clamp 540 are aligned with the entry notches 414 of the disk hub 402, the disk clamp 540 and disk hub 402 are moved toward each other. Then, the disk clamp 540 and the disk hub 402 are rotated with respect to each other until at least one of the disk retaining tabs 504 of the disk clamp 540 engages a retaining tab 412 of the disk hub 402. After, at least one of the retaining tabs 504 of the disk clamp 504 engages a retaining tab 412 of the disk hub 402, the deflection of the disk pressure applying portion 506 is released, and engages the disk 104. The deflection and installation are discussed in more detail below.

Further, in some embodiments, one or more notches 512 may be provided in the pressure applying portion 506 to provide a gripping location for deflection of the disk pressure applying portion 506.

Figure 6:
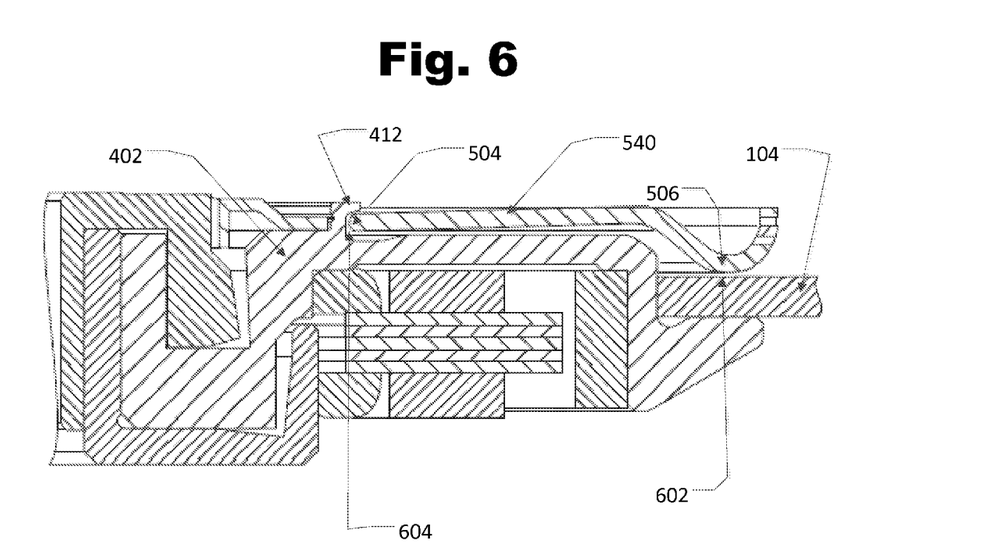
FIG. 6 is a partial section view of the second example embodiment of the disk hub and second example embodiment of the disk clamp in a deflected state.

FIG. 6 is a partial section view of the second example embodiment of the disk hub and second example embodiment of the disk clamp in a deflected state. Further, FIG. 7 is a partial section view of the second example embodiment of the disk hub and second example embodiment of the disk clamp in a non-deflected state.

Figure 7:
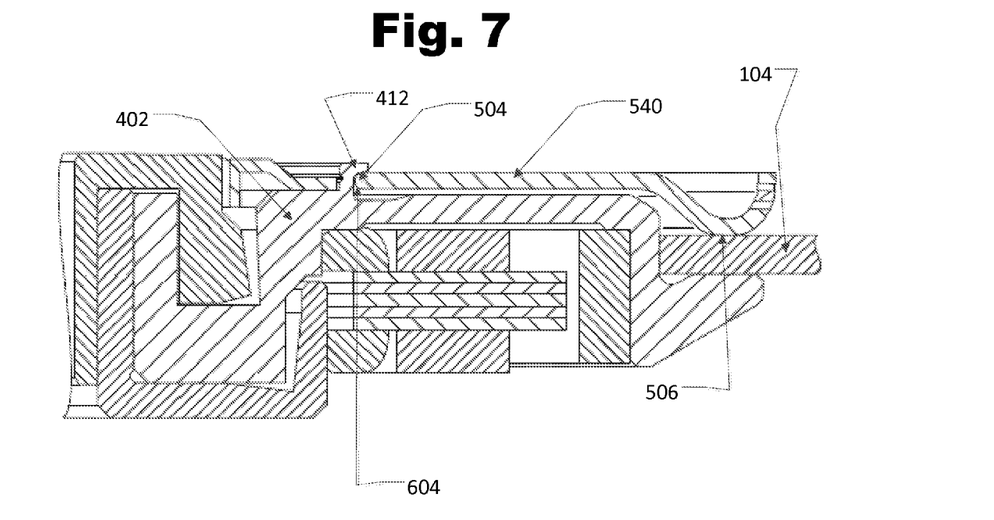
FIG. 7 is a partial section view of the second example embodiment of the disk hub and second example embodiment of the disk clamp in a non-deflected state.

As illustrated, in FIGS. 6 and 7, the disk clamp 540 has been mounted to the disk hub 402 with the disk 104 disposed there between. Specifically, as discussed above, to reach the configuration as shown in FIG. 7, the disk pressure applying portion 506 is deflected as shown in FIG. 6, the retaining tabs 504 of the disk clamp 540 are aligned with the entry notches 414 of the disk hub 402, and the disk clamp 540 and disk hub 402 are moved toward each other. As shown in FIG. 6, the deflection of the disk pressure applying portion 506 creates an air gap 602 between the disk 104 and the disk pressure applying portion 506.

After the disk clamp 540 and the disk hub 402 are moved toward each other, the disk clamp 540 and the disk hub 402 are rotated with respect to each other until at least one of the disk retaining tabs 504 of the disk clamp 540 engages a retaining tab 412 of the disk hub 402 as shown in FIGS. 6 and 7. The portion of the disk retaining tab 504 of the disk clamp 540 that engages the retaining tab 412 of the disk hub 402 is an engaging feature 604. In this example embodiment, the engaging feature 604 extends radially inward in a substantially horizontal direction. However, the engaging feature 604 is not limited to this configuration as shown below.

As shown in FIG. 6, after the retaining tab 504 of the disk clamp 540 engages the retaining tab 412 of the disk hub 402, the deflection of the disk pressure applying portion 506 is released, and the disk pressure applying portion 506 engages the disk 104. By pre-deflecting the disk pressure applying portion 506 of the disk clamp 540 and then rotating the disk clamp 540 and the disk hub 402 with respect to each other, friction across the disk 104 may be reduced, which can reduce the amount of scrub or particles generated during assembly. However, an embodiment need not have a reduction in the amount of scrub or particles generated.

Figure 8:
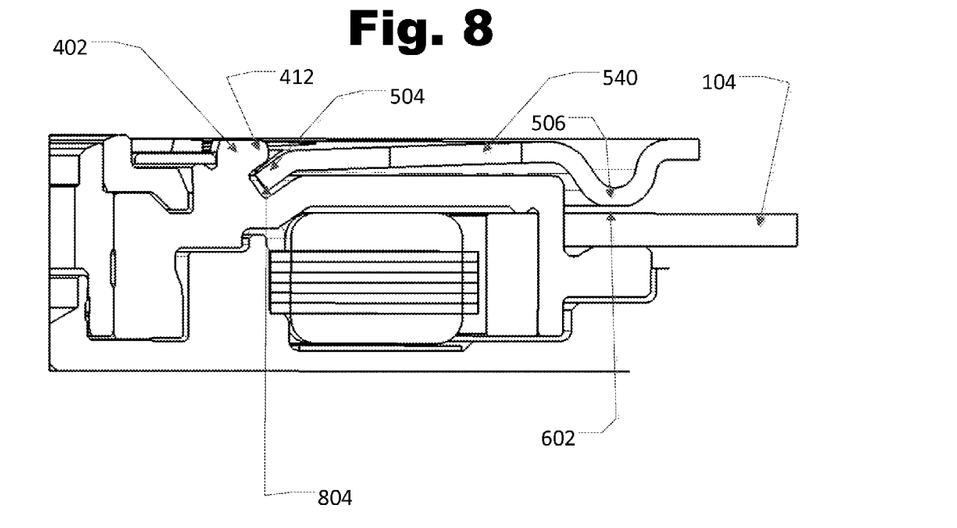
FIG. 8 is a partial section view of a third example embodiment of the disk hub and a third example embodiment of the disk clamp in a deflected state.
Figure 9:
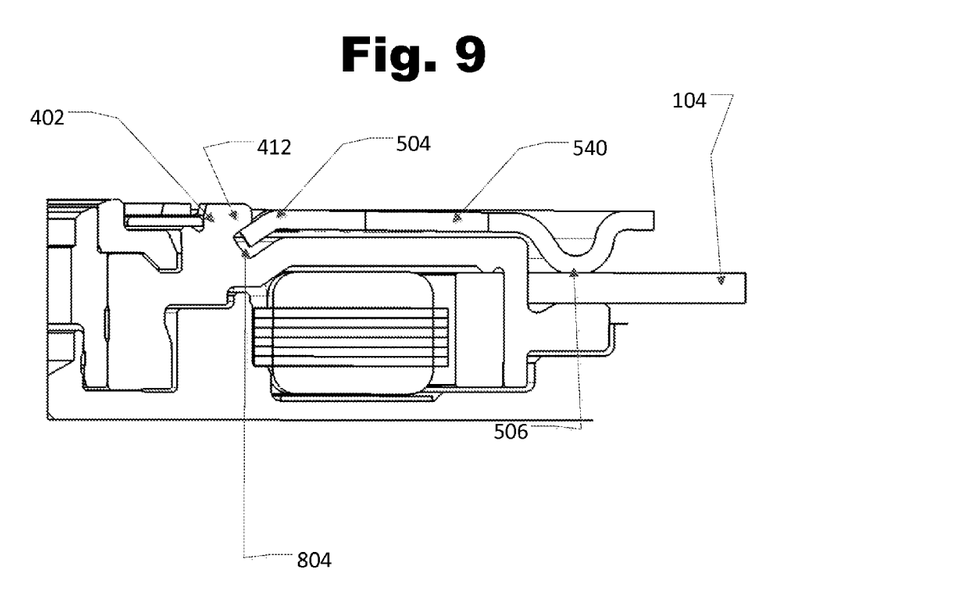
FIG. 9 is a partial section view of the third example of the disk hub and third example embodiment of the disk clamp in a non-deflected state.

FIG. 8 is a partial section view of a third example embodiment of the disk hub and a third example embodiment of the disk clamp in a deflected state. Further, FIG. 9 is a partial section view of the third example embodiment of the disk hub and the third example embodiment of the disk clamp in a non-deflected state. The third example embodiment of the disk hub and the third example embodiment of the disk clamp are similar to the second example embodiments of the disk hub and disk clamp discussed above with respect to FIGS. 4-7. Thus, similar reference numerals are used for similar features.

As illustrated, in FIGS. 8 and 9, the disk clamp 540 has been mounted to the disk hub 402 with the disk 104 disposed there between. Specifically, as discussed above, to reach the configuration in FIG. 9, the disk pressure applying portion 506 is deflected as shown as FIG. 8, the retaining tabs 504 of the disk clamp 540 are aligned with the entry notches 414 of the disk hub 402 and the entry notches 414 of the disk hub 402, and the disk clamp 540 and disk hub 402 are moved toward each other. As shown in FIG. 8, the deflection of the disk pressure applying portion 506 creates an air gap 602 between the disk 104 and the disk pressure applying portion 506.

After the disk clamp 540 and the disk hub 402 are moved toward each other, the disk clamp 540 and the disk hub 402 are rotated with respect to each other until at least one of the disk retaining tabs 504 of the disk clamp 540 engages a retaining tab 412 of the disk hub 402 as shown in FIGS. 8 and 9. The portion of the disk retaining tab 504 of the disk clamp 540 that engages the retaining tab 412 of the disk hub 402 is an engaging feature 804. In this example embodiment, the engaging feature 804 extends radially inward at an angle between a substantially horizontal direction and a substantially vertical direction. However, the engaging feature 804 is not limited to this configuration and may extend in a substantially horizontal direction as discussed above, or may extend in a substantially vertical direction to engage the disk hub 402.

As shown in FIG. 9, after the retaining tab 504 of the disk clamp 540 engages the retaining tab 412 of the disk hub 402, the deflection of the disk pressure applying portion 506 is released, and the disk pressure applying portion 506 engages the disk 104. By pre-deflecting the disk pressure applying portion 506 of the disk clamp 540 and then rotating the disk clamp 540 and the disk hub 402 with respect to each other, friction across the disk 104 may be reduced, which can reduce the amount of scrub or particles generated during assembly. However, an embodiment need not have a reduction in the amount of scrub or particles generated.

Figure 10:
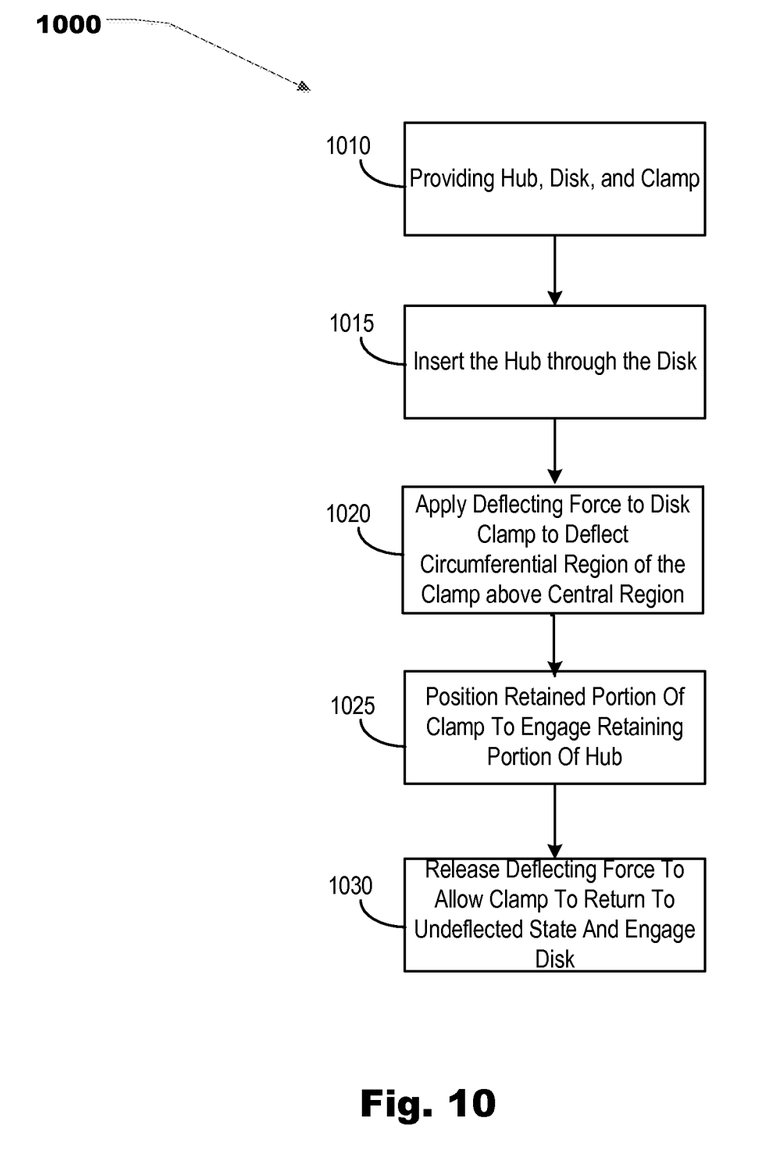
FIG. 10 illustrates a flowchart for a method of manufacturing a disk drive, according to one or more example embodiments.

FIG. 10 illustrates a flow chart for a method 1000 of manufacturing a disk drive, according to one illustrated embodiment. This method 1000 will be discussed in the context of the hub 102 and the disk clamp 140 of FIGS. 1-3. However, the acts disclosed herein may be executed using a variety of different disk hubs and disk clamps, in accordance with the described method. For example, the acts disclosed herein may alternatively be executed using the hub 402 and the disk clamp 540 of FIGS. 4-9.

As described herein, at least some of the acts comprising the method 1000 may be orchestrated by a processor according to an automatic disk drive manufacturing algorithm, based at least in part on computer-readable instructions stored in computer-readable memory and executable by the processor. A manual implementation of one or more acts of the method 1000 may also be employed, in other embodiments.

At act 1010, a disk hub 102, a disk 104 and a disk clamp 140 are provided. The hub 102 may define a mounting surface 142 and a cylindrical portion 108 having a vertical surface 202. In some embodiments, a notch 204 may be formed in the vertical surface 202 of the hub 102.

The disk clamp 140 may define a body 302 from which one or more retaining tabs 304 extend radially inward. Further, the disk clamp 140 may also define one or more disk pressure applying portions 306 extending radially outward to form a circumferential region of the disk clamp 140.

The disk 104 may define an opening there through having an inner diameter. The disk 104 may be formed in a variety of ways. In one embodiment, the media of the disk 104 may be formed, and then the first disk 104 may be stamped, cast, machined or otherwise formed to define the first opening.

The hub 102 may also be formed in a variety of ways. In one embodiment, the hub 102 may be machined to form the mounting surface 142, the cylindrical portion 108 and the vertical surface 202. In other embodiments, the hub 102 may be cast, molded or machined to form the mounting surface 142 and the vertical surface 202. In still other embodiments, other manufacturing techniques may be employed.

Similarly, the manufacturing method of the disk clamp 140 is not particularly limited and may include machining, casting, molding, or any other methods as would be apparent to a person of ordinary skill in the art.

At act 1015, the disk 104 is positioned against the mounting surface 142 of the hub 102. The cylindrical portion 108 of the hub 102 may be inserted through the opening formed in the disk 104 and the disk 104 may be positioned in physical contact with the mounting surface 142. In some embodiments, a machine vision system may help align the disk 104 and the mounting surface 142 of the hub 102.

At act 1020, the one or more disk pressure applying portions forming a circumferential region of the disk clamp 140 are deflected above body portion 302 disposed radially inward of the circumferential region of the disk clamp 140. The deflection can be performed by a user manually grasping the disk pressure applying portions 306. Alternatively, a machine may grasp the disk pressure applying portions 306 using one or more notches 308 formed in the circumferential region of the disk clamp 140.

At act 1025, while the disk pressure applying portions 306 are held in a deflected state, the retaining tabs 304 of the disk clamp 140 are positioned to engage the notches 204 formed in the vertical surface of the hub 102. Specifically, the retaining tabs 304 of the disk clamp 140 are aligned with the entry portions 206 of the notches 204 of the disk hub 102. Once the retaining tabs 304 of the disk clamp 140 are aligned with the entry portions 206 of the notches 204 of the disk hub 102, the disk clamp 140 and disk hub 102 are moved toward each other. Then, the disk clamp 140 and the disk hub 102 are rotated with respect to each other until at least one of the disk retaining tabs 304 of the disk clamp 140 engages a retaining portion 208 of a notch 204 of the disk hub 102. In some embodiments, a machine vision system may help align the disk clamp 140 and the disk hub 102. Further, the rotation of the disk clamp 140 and the disk hub 102 with respect to each other may be performed manually by a user or may be performed automatically by a machine. The machine is not particularly limited.

At act 1030, the deflection of the disk pressure applying portion 306 is released, and disk pressure applying portion 306 returns to an un-deformed state so as to engage the disk 104.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A disk drive assembly comprising:
a disk hub comprising:
a cylindrical portion; and
a disk clamp retaining portion formed on a vertical portion of the cylindrical portion of the disk hub, wherein the disk clamp retaining portion comprises an entry portion forming a reduced radius region with a cutout portion at a top surface of an upper edge of the cylindrical portion and
a retaining portion that communicates with the entry portion and forms a reduced radius region spaced below and apart from the upper edge of the cylindrical portion;
a disk clamp comprising:
a body portion; and
a retained portion which engages the disk clamp retaining portion of the disk hub to secure the disk clamp to the disk hub; and
a disk media disposed between the disk clamp and the disk hub, the disk media being secured in place by the disk clamp.

2. The disk drive assembly according to claim 1, wherein:
the entry portion and retaining portion together form at least one semi-circumferential notch formed in the vertical portion of the cylindrical portion of the disk hub; and
the retained portion of the disk clamp extends radially inward from the body portion of the disk clamp and comprises at least one engaging feature disposed at a radially inner portion of the retained portion to engage the semi-circumferential notch of the disk hub to secure the disk clamp to the disk hub.

3. The disk drive assembly according to claim 2, wherein the disk clamp retaining portion of the disk hub further comprises a groove formed in the vertical portion, communicating with the semi-circumferential notch and extending completely around the circumference of the cylindrical portion.

4. The disk drive assembly according to claim 2, wherein the disk clamp retaining portion of the disk hub further comprises a groove formed in the vertical portion, communicating with the semi-circumferential notch and extending completely around the circumference of the cylindrical portion.

5. The disk drive assembly according to claim 2, wherein the engaging feature is at least one of a substantially horizontally extending tab, a substantially vertically extending tab, and a diagonally extending tab, which extends at an angle to the horizontal and vertical planes defined by the disk clamp body.

6. The disk drive assembly according to claim 2, wherein:
at least two notches are formed in the vertical portion in a regularly spaced configuration; and at least two retained portions are formed to extend radially inward from the body portion of the disk clamp in a regularly spaced configuration.

7. The disk drive assembly according to claim 1, wherein:
the entry portion and retaining portion together form at least one tab extending radially outward from the vertical portion of the cylindrical portion of the disk hub; and
the retained portion of the disk clamp extends radially inward from a central opening formed in the disk clamp and comprises at least one engaging feature disposed at a radially inner portion of the retained portion configured to engage an under surface of the tab extending radially outward from the vertical portion of the cylindrical portion of the disk hub.

8. The disk drive assembly according to claim 7, wherein the engaging feature is at least one of a substantially horizontally extending tab, a substantially vertically extending tab, and a diagonally extending tab, which extends at an angle to the horizontal and vertical planes defined by the disk clamp body.

9. The disk drive assembly according to claim 7, wherein:
at least two tabs are formed to extend radially outward from the vertical portion of the cylindrical portion of the disk hub in a regularly spaced configuration; and
at least two retained portions are formed to extend radially inward from the central opening of the disk clamp in a regularly spaced configuration.

10. The disk drive assembly according to claim 1, wherein the body portion of the disk clamp is elastically deformable and configured to (1) be deflected away from the disk media when a deflecting force is applied during assembly and (2) return to provide a clamping force to the disk media when the deflecting force is released.

11. A disk hub for a disk drive assembly comprising:
a cylindrical portion; and
a disk clamp retaining portion formed on a vertical portion of the cylindrical portion,
wherein the disk clamp retaining portion is configured to engage a portion of a disk clamp to secure the disk clamp to the disk hub; and
wherein the disk clamp retaining portion comprises an entry portion forming a reduced radius region with a cutout portion at a top surface of an upper edge of the cylindrical portion and
a retaining portion that communicates with the entry portion and forms a reduced radius region spaced below and apart from the upper edge of the cylindrical portion.

12. The disk hub according to claim 11, wherein:
the entry portion and retaining portions together form at least one semi-circumferential notch formed in the vertical portion of the cylindrical portion of the disk hub.

13. The disk drive hub according to claim 12, wherein the disk clamp retaining portion of the disk hub further comprises a groove formed in the vertical portion, communicating with the semi-circumferential notch and extending completely around the circumference of the cylindrical portion.

14. The disk drive hub according to claim 12, wherein the disk clamp retaining portion of the disk hub further comprises a groove formed in the vertical portion, communicating with the semi-circumferential notch and extending completely around the circumference of the cylindrical portion.

15. The disk hub according to claim 12, wherein:
at least two notches are formed in the vertical portion in a regularly spaced configuration.

16. The disk hub according to claim 11, wherein:
the entry portion and retaining portion together form at least one tab extending radially outward from the vertical portion of the cylindrical portion of the disk hub.

17. The disk hub according to claim 16, wherein:
at least two tabs are formed to extend radially outward from the vertical portion of the cylindrical portion in a regularly spaced configuration.

18. A disk clamp for a disk drive assembly comprising:
a body portion; and
a retained portion which extends radially inward from the body portion and is configured to engage a disk clamp retaining portion of a disk hub to secure the disk clamp to the disk hub, the disk clamp retaining portion of the disk hub comprising
an entry portion forming a reduced radius region with a cutout portion at a top surface of an upper edge of the cylindrical portion and
a retaining portion that communicates with the entry portion and forms a reduced radius region spaced below and apart from the upper edge of the cylindrical portion.

19. The disk clamp according to claim 18, wherein:
the retained portion of the disk clamp comprises at least one engaging feature disposed at a radially inner portion of the retained portion to engage with a notch formed in a vertical portion of the disk hub to secure the disk clamp to the disk hub.

20. The disk clamp according to claim 19, wherein the engaging feature is at least one of a substantially horizontally extending tab, a substantially vertically extending tab, and a diagonally extending tab, which extends at an angle to the horizontal and vertical planes defined by the disk clamp body.

21. The disk clamp according to claim 19, wherein:
at least two retained portions are formed to extend radially inward from the body portion of the disk clamp in a regularly spaced configuration.

22. The disk drive clamp according to claim 18, wherein:
the retained portion comprises at least engaging feature disposed at a radially inner portion of the retailed portion configured to engage an under surface of a retaining tab extending outward from the vertical portion of a cylindrical portion of the disk hub.

23. The disk clamp according to claim 22, wherein the engaging feature is at least one of a substantially horizontally extending tab, a substantially vertically extending tab, and a diagonally extending tab, which extends at an angle to the horizontal and vertical planes defined by the disk clamp body.

24. The disk drive clamp according to claim 22, wherein:
at least two retained portions are formed to extend radially inward from the central opening of the disk clamp in a regularly spaced configuration.

25. The disk drive clamp according to claim 18, wherein the body portion of the disk clamp is elastically deformable and configured to (1) be deflected when a deflecting force is applied during assembly and (2) return to provide a clamping force to a disk when the deflecting force is released.

26. A method of assembling a disk drive comprising:
providing a disk hub having a disk clamp retaining portion formed in a vertical portion of a central cylindrical portion of the disk hub, a disk clamp having a retained portion extending radially inward from a body portion, and a disk;
positioning the disk proximate to the disk hub such that the central cylindrical portion of the disk hub is inserted into a hole formed through the disk;
apply deflecting force to the body portion of the disk clamp to deflect a circumferential region of the disk clamp either upward or downward away from a horizontal plane of the retained portion of the disk clamp;

positioning the retained portion of the disk clamp to align with a reduced radius entry portion with a cutout portion at a top surface of an upper edge of the disk clamp retaining portion of the disk hub; and releasing the deflecting force to allow the circumferential region of the clamp to return to an un-deflected position to engage the disk and apply clamping force to the disk.

27. The method of claim 26, wherein the positioning the retained portion of the disk clamp comprises:

aligning the retained portion of the disk clamp with a portion of the disk hub adjacent to the disk clamp retaining portion; and rotating the disk clamp to cause the retained portion of the disk clamp to engage the disk clamp retaining portion of the disk hub.

\* \* \* \* \*